United States Patent [19]

Shiga et al.

[11] 3,960,765
[45] June 1, 1976

[54] CATALYST FOR POLYMERIZATION OF OLEFINS AND PROCESS FOR PREPARING THE SAME

[75] Inventors: Akinobu Shiga; Yoshiharu Fukui; Kazuhiro Matsumura; Satoru Uchida, all of Niihama, Japan

[73] Assignee: Sumitomo Chemical Company, Limited, Osaka, Japan

[22] Filed: Nov. 4, 1974

[21] Appl. No.: 520,817

[30] Foreign Application Priority Data

Nov. 2, 1973    Japan.............................. 48-123781

[52] U.S. Cl. ............................ 252/429 B; 526/135; 526/136; 526/141; 526/142; 526/154; 526/209; 526/217; 526/222; 526/226; 526/348; 526/351
[51] Int. Cl.$^2$............................................ C08F 4/16
[58] Field of Search ................................ 252/429 B

[56] References Cited

UNITED STATES PATENTS

| | | | |
|---|---|---|---|
| 3,116,274 | 12/1963 | Boehm et al. ................ | 252/429 B X |
| 3,445,446 | 5/1969 | Farrar ......................... | 252/429 B X |
| 3,530,107 | 9/1970 | Yoshioka et al. ........... | 252/429 B X |
| 3,663,450 | 5/1972 | Cozewith et al. ............... | 252/429 B |

*Primary Examiner*—Patrick P. Garvin
*Attorney, Agent, or Firm*—Sughrue, Rothwell, Mion, Zinn & Macpeak

[57] ABSTRACT

A process for preparing a solid catalyst for the polymerization of olefins which comprises the steps of (1) reducing titanium tetrachloride with an organoaluminum compound, (2) treating the resulting $\beta$-type titanium trichloride with a complexing agent, (3) treating the solid catalyst thus obtained with an organoaluminum compound, and (4) treating the resulting solid catalyst with a complexing agent, and a solid catalyst for the polymerization of olefins prepared by the above process.

9 Claims, No Drawings

CATALYST FOR POLYMERIZATION OF OLEFINS AND PROCESS FOR PREPARING THE SAME

BACKGROUND OF THE INVENTION

1. Field of the Invention

This invention relates to a catalyst for the polymerization of olefins and a process for preparing the same. More particularly, this invention relates to a catalyst for the polymerization of olefins which is capable of producing highly stereospecific olefin polymers, and a process for preparing the catalyst which is useful for the production of the above olefin polymers.

2. Description of the Prior Art

Hitherto, it was well-known that olefin polymers could be obtained in a high yield by polymerizing olefins using a ctalyst comprising a transition metal compound of the Groups IV to VI of the Periodic Table and a metal or an organometallic compound of the Groups I to III of the Periodic Table, i.e., a so-called Ziegler-Natta catalyst, and that the polymers produced by the above process would be generally in the form of a slurry of polymers where amorphous polymers are also produced as byproducts in addition to the crystalline olefin polymer.

In such a polymerization process, the bulk density of the olefin polymers produced generally affects the productivity of polymers and, therefore, and improvement in the bulk density is desirable in order to increase the efficiency of the reactor used for the polymerization.

Also, in olefin polymers, the stereospecificity of the polymers greatly affects the mechanical properties of the molded articles such as films, fibers and other articles prepared from the polymers.

Further, the production of amorphous polymers as by-products which are of commercially less value in the industrial utilization results in the loss of monomers used for the polymerization and, in addition, necessarily requires equipment for the removal of such amorphous polymers, thereby making the polymerization process uneconomical and disadvantageous from an industrial standpoint. Accordingly, it is considered that the polymerization process capable of producing polymers which are substantially free from amorphous polymers or which contain only a minimum amount of amorphous polymers is apparently one of the advantages in the production of polymers on an industrial scale.

On the other hand, the polymers obtained by such polymerization processes contain a residual catalyst which subsequently causes various problems such as instability and coloration of the olefin polymers, thus requiring equipment for the removal of the residual catalyst.

The above disadvantages associated with the conventional catalyst can be improved if the polymerization activity of the catalyst, i.e., a unit weight of the olefin polymer produced per a unit weight of the catalyst used for the olefin polymerization, can be increased, whereby the equipment required for the removal of the residual catalyst can be eliminated and the cost for the production of olefin polymers can be reduced.

A typical solid catalyst which has been conventionally used for the polymerization of olefins is titanium trichloride. The titanium trichloride catalyst is generally prepared from titanium tetrachloride by (1) reduction with hydrogen, (2) reduction with aluminum metal at high temperatures, (3) reduction with an organoaluminum compound at approximately room temperature, or the like.

Titanium trichloride obtained by the organoaluminum reduction of titanium tetrachloride has a β-type crystal structure, and the polymer produced by polymerizing olefins using a catalyst comprising a combination of the above β-type titanium trichloride and an organoaluminum compound has a practical problem because of its low stereospecificity, i.e., having a 70 to 80% content which is insoluble in boiling heptane.

The present inventors previously found that a solid catalyst which is useful for the production of olefin polymers having a high stereospecificity could be prepared by treating a β-type titanium trichloride, which had been previously obtained by the reduction of titanium tetrachloride with an organoaluminum compound, with a certain type of complexing agent and subsequently treating the resulting catalyst with a monoalkyl aluminum dihalide. Although the above solid catalyst provides olefin polymers having remarkably increased stereospecificity and bulk density, it is still unsatisfactory in regard to catalyst activity during the polymerization and, therefore, is disadvantageous in that the residual amount of the catalyst after polymerization is not negligible.

SUMMARY OF THE INVENTION

An object of the present invention is to provide an improved catalyst for the polymerization of olefins, which is capable of producing highly stereospecific olefin polymers containing a minimum amount of amorphous polymer and which is greatly improved with respect to the removal of residual catalyst.

Another object of this invention is to provide a process for preparing such a catalyst.

DETAILED DESCRIPTION OF THE INVENTION

As a result of various studies conducted in order to eliminate the disadvantages associated with conventional titanium trichloride catalysts, it was found that the catalytic activity on the polymerization could be markedly increased by treatments set forth hereinafter.

The present invention provides a process for preparing a solid catalyst for the polymerization of olefins which comprises the steps of (1) reducing titanium tetrachloride with an organoaluminum compound represented by the formula $$R_n AlX_{3-n} \tag{I}$$

wherein R represents a straight chain or branched chain alkyl group having 1 to 18 carbon atoms, an alicyclic hydrocarbon group or an aromatic hydrocarbon group, X represents a halogen atom, and $n$ is a value of from 1 to 3, inclusive, (2) treating th resulting β-type titanium trichloride with a complexing agent, (3) treating the solid catalyst thus obtained with an organoaluminum compound represented by the formula $$R'_m AlX_{3-m} \tag{II}$$

wherein R' represents a straight chain or branched chain alkyl group having 1 to 18 carbon atoms, an alicyclic hydrocarbon group or an aromatic hydrocarbon group, X represents a halogen atom, and $m$ is a value of $0 < m < 1.5$, and (4) treating the resulting solid catalyst with a complexing agent, and the catalyst prepared by the above process.

Examples of the organoaluminum compounds which can be used for the preparation of the β-type titanium trichloride are methyl aluminum dichloride, ethyl aluminum dichloride, n-propyl aluminum dichloride, methyl aluminum sesquichloride, ethyl aluminum sesquichloride, dimethyl aluminum chloride, diethyl aluminum chloride, di-n-propyl aluminum chloride, trimethyl aluminum, triethyl aluminum, triisobutyl chloride, and the like, but the organoaluminum compound is not limited to the above specific examples.

The reduction reaction for producing a β-type titanium trichloride can be carried out at a temperature of from about −100° to about 60°C, preferably from −30° to 30°C. Also, it is preferred to carry out the reduction reaction in the presence of an inert diluent such as hexane, heptane, octane, decalin and the like.

The β-type titanium trichloride thus obtained is then treated with a complexing agent. The complexing agents can be selected broadly from the compounds having at least one atom selected from N, O, P and S in the molecule thereof such as alcohols, aldehydes, acids, acid anhydrides, ketones, esters, amides, imides, ethers, mercaptans, thioethers, nitriles, amines, lactams, phosphoric amides and the like, but the compounds selected from amides, ethers, thioethers and amines generally provide better results, with the particularly preferred compounds being ethers.

Examples of the complexing agents which can be used for the treatment of the β-type titanium trichloride are N,N-dimethylformamide, N,N-dimethylacetamide, N,N-dimethylpropionamide, N,N,N',N'-tetramethylurea, diethyl ether, di-n-propyl ether, diisopropyl ether, di-n-butyl ether, diisobutyl ether, di-tert-butyl ether, di-n-amyl ether, diisoamyl ether, dineopentyl ether, di-n-hexyl ether, di-n-octyl ether, diphenyl ether, di-o-tolyl ether, di-p-tolyl ether, dicyclohexyl ether, diethyl sulfide, di-n-propyl sulfide, di-n-butyl sulfide, di-tert-butyl sulfide, diphenyl sulfide, trimethylamine, triethylamine, tri-n-butylamine, triphenylamine, pyridine, quinoline, sym-triazine, N,N-dimethylaniline, N,N-diethylaniline, N,N,N',N'-tetramethylethylenediamine and the like. However, it is to be noted that the present invention is not limited to the use of the above complexing agent.

The treatment of the β-type titanium trichloride with a complexing agent is advantageously carried out in the presence of a diluent. Examples of the diluent which can be used are inert hydrocarbon compounds such as hexane, heptane, octane, decalin and the like.

The complexing agent can be used in an amount ranging from about 0.05 to about 3 moles, preferably 0.5 to 1.5 moles, per mole of titanium trichloride.

The temperature for the treatment is preferably from about 0° to about 100°C.

The resulting solid thus treated with the complexing agent is subsequently treated with an organoaluminum compound represented by the formula

   (II)

wherein R' represents a straight chain or branched chain alkyl group having 1 to 18 carbon atoms, an alicyclic hydrocarbon group or an aromatic hydrocarbon group, X represents a halogen atom and $m$ is a value of $0 < m < 1.5$.

Particularly preferred examples of the organoaluminum compounds which can be used in the above treatment are monoalkyl aluminum dihalides, but a mixture of a monoalkyl aluminum dihalide and other organoaluminum compounds, for example, a mixture of a monoalkyl aluminum dihalide and an aluminum trihalide, a mixture of a monoalkyl aluminum dihalide and an alkyl aluminum sesquihalide or the like, also provides satisfactory results.

On the other hand, organoaluminum compounds other than those represented by the above formula (II) or mixtures thereof, e.g., alkyl aluminum sesquihalides, dialkyl aluminum monohalides, a trialkyl aluminum and the like, do not exhibit the effects contemplated in the present invention. Also, the catalysts prepared without effecting the treatment with a complexing agent exhibit less catalytic activity as compared with that of the catalysts prepared in accordance with the process of this invention as shown in Comparative Example 2.

Typical examples of the organoaluminum compounds represented by the formula (II) which can be used in the present invention are methyl aluminum dichloride, ethyl aluminum dichloride, n-propyl aluminum dichloride, n-butyl aluminum dichloride, n-hexyl aluminum dichloride, n-octyl aluminum dichloride, phenyl aluminum dichloride, o-tolyl aluminum dichloride, cyclohexyl aluminum dichloride, methyl aluminum dibromide, ethyl aluminum dibromide, phenyl aluminum dibromide, methyl aluminum diiodide, ethyl aluminum diiodide and the like. However, it is to be understood that other organoaluminum compounds defined by the above formula (II) can also be used and the present invention is not limited to the above enumerated specific compounds. These organoaluminum compounds can be used alone or as a combination of two or more organoaluminum compounds.

The treatment with the above organoaluminum compounds can be effected in the presence or absence of a diluent. Examples of the diluent which can be used are inert hydrocarbon compounds such as hexane, heptane, octane, decalin and the like.

The temperature for the treatment with the organoaluminum compounds is not critical, but temperatures from about room temperature (about 20°–30°C) to about 200°C are preferably used.

The thus obtained solid catalyst is further treated with a complexing agent. The complexing agent used in this treatment can be the same as or different from those used in the previous treatment of the β-type titanium trichloride and is generally selected optionally from those used in the treatment of the β-type titanium trichloride. Better results can generally be obtained with the complexing agents of amides, ethers, thioethers and amines. Of these agents, ether type complexing agents provide particularly preferred results.

The treatment with the complexing agent can be advantageously carried out in the presence of a diluent. Examples of the diluent which can be used in this treatment are inert hydrocarbon compounds such as hexane, heptane, octane, decalin and the like.

The amount of the complexing agent used is not critical and can vary over a wide range of from about 0.001 to about 10 moles per mole of the titanium trichloride to be treated. However, generally, an amount more than about 0.01 mole of the complexing agent per mole of the titanium trichloride is advantageously used since the treatment with the complexing agent in an amount less than about 0.01 mole sometimes results in unsatisfactory effects.

The treatment with the complexing agent can be carried out at a temperature of from about −78° to about 150°C. The time required for the treatment is not critical.

The solid catalyst in accordance with the present invention can be used for the polymerization of olefins in combination with an organoaluminum compound. The organoaluminum compounds for the above purpose are preferably dialkyl aluminum halides, particularly diethyl aluminum chloride.

The molar ratio of the solid catalyst and the organoaluminum compound used for the polymerization of olefins can vary widely from about 10 : 1 to about 1 : 200, preferably from 2 : 1 to 1 : 100.

The concentration of the organoaluminum compound in the polymerization system varies widely from an extremely low concentration, i.e., 0.1 m mole/l, to a high concentration, i.e., without using any diluent.

The polymerization can be carried out at a temperature in the range of from −50° to about 200°C, but polymerization temperatures above about 100°C usually adversely affect the production of polymers having a high stereospecificity. The preferred polymerization temperature is therefore in the range of from about 0° to about 100°C. The polymerization pressure is not critical, but a pressure in the range of from about 3 to about 100 atms is preferred from the industrial and economical standpoints. The polymerization can be effected in a continuous manner or a batch manner as well-known to those skilled in the art.

The olefins which can be polymerized using the solid catalyst of this invention are olefinic hydrocarbons having 2 to 15 carbon atoms which can be straight chain or branched chain hydrocarbons. Also, the olefinic hydrocarbons may contain aromatic hydrocarbon groups and/or alicyclic hydrocarbon groups.

Typical examples of the olefinic hydrocarbons which can be polymerized are ethylene, propylene, butene-1, pentene-1, hexene-1, octene-1, decene-1, 3-methylpentene-1, 4-methylpentene-1, styrene and the like, but the present invention is not limited to the above specific olefinic hydrocarbons.

The solid catalyst of this invention can be used for both homopolymerization and copolymerization of the olefinic hydrocarbons. In copolymerizing the olefins, the solid catalyst of this invention is contacted with two or more different types of olefins in an admixed state to obtain a copolymer. In employing the solid catalyst in the copolymerization of two different types of olefin monomers, it is preferred that one of the two olefin monomers is used in a proportion of less than about 10 mole% with respect to other olefin monomer in order to obtain a highly stereospecific copolymer.

The polymerization can be conducted by a slurry polymerization using an inert solvent such as hexane, heptane, octane, decalin and the like, or in the absence of solvents.

The present invention is further illustrated by the following Examples in greater detail, but these Examples are not to be construed as limiting the scope of this invention. Unless otherwise indicated, all parts, percents, ratios and the like are by weight.

EXAMPLE 1

Catalyst Preparation 1

Preparation of β-Type Titanium Trichloride

A 1 l reactor was purged with argon, and 200 cc of dried hexane and 50 cc of titanium tetrachloride were charged into the reactor followed by maintaining the mixture at a temperature of −5°C. A solution consisting of 150 cc of dried hexane and 58 cc of diethyl aluminum chloride was then added dropwise to the reactor at such a rate that the temperature of the reaction system was maintained below −3°C. After completion of the addition, the resulting mixture was stirred for an additional 30 minutes and, after the temperature of the mixture was allowed to raise to 70°C, the stirring was further continued for an additional 1 hour. The mixture was then allowed to stand to settle the precipitate and the supernatant was removed. The resulting precipitate was washed with 150 cc of hexane to obtain 70 g of β-type titanium trichloride which contained 4.53% of aluminum.

Catalyst Preparation 2

Treatment of β-Type Titanium Trichloride with Complexing Agent 67 g of the β-type titanium trichloride prepared as above was suspended in 500 cc of dried hexane, and 58.0 cc of di-n-butyl ether (a molar ratio of di-n-butyl ether/titanium trichloride, 1.0) was added to the suspension followed by stirring the mixture for 1 hour at a temperature of 40°C. After completion of the reaction, the supernatant was removed, and the residual solid was washed 3 times with 150 cc portions of hexane and dried to obtain a solid catalyst (I).

Catalyst Preparation 3

Treatment of Solid Catalyst (I) with Ethyl Aluminum Dichloride

A mixture of 65 g of the solid catalyst (I) obtained as above by the treatment with the complexing agent and 100 cc of ethyl aluminum dichloride was stirred for 2 hours while maintaining the mixture at a temperature of 90°C. The resulting solid was separated by centrifugation, washed 4 times with 500 cc portions of hexane and dried to obtain a solid catalyst (II).

Catalyst Preparation 4

Treatment of Solid Catalyst (II) with Complexing Agent 2.0 g of the solid catalyst (II) was suspended in 10 cc of dried hexane and 3.3 cc of di-n-butyl ether (a weight ratio of di-n-butyl ether/solid catalyst (II), 1.25) was added to the suspension followed by stirring at room temperature (about 20°–30°C) for 1 hour. After allowing the resulting mixture to stand, the liquid phase was removed, and the solid thus obtained was washed 3 times with 30 cc portions of hexane and dried to obtain the solid catalyst (III).

Polymerization of Propylene

Polymerization Process 1

A 5 l stainless steel autoclave equipped with a stirrer was purged with nitrogen and charged with 1.5 l of dried heptane, 4.5 g of diethyl aluminum chloride and 673 mg of the solid catalyst (III) prepared as described in Catalyst Preparations. Hydrogen was then introduced into the autoclave to the pressure corresponding to a partial pressure of 0.16 kg/cm². The temperature in the autoclave was elevated to 60°C, and propylene was introduced into the autoclave to a pressure of 6 kg/cm²G and polymerized while keeping the pressure at 6 kg/cm²G by introducing a propylene monomer for 4 hours. After completion of the polymerization, introduction of the propylene monomer was stopped and propylene gas remaining in the autoclave was then purged and 100 cc of butanol was added to the polymerization system to decompose the catalyst. The polymer thus produced was separated by filtration using a Buchner funnel, washed with 3 times with 500 cc portions of heptane and dried at 60°C under reduced pressure to obtain 945 g of a polypropylene. The filtrate was subjected to a steam distillation to distill heptane whereby a small amount of amorphous polymers produced as by-products was recovered.

The polymerization activity of the solid catalyst (III) used above was 350 in terms of the polymerization rate (Rp) per 1 g of the solid catalyst (III) per 1 hour (g-polymer/g-catalyst (III). hr.). The polymer content which is insoluble in boiling hexane in the resulting polymer was found to be 96.3%, indicating that the polymer is highly stereospecific. The polymer thus obtained had a bulk density of 0.45 and an intrinsic viscosity [$\eta$] of 1.97 in tetralin at 135°C.

Polymerization Process 2

A 5 l stainless steel autoclave equipped with a stirrer was purged with nitrogen and charged with 4.5 g of diethyl aluminum chloride and 60.2 mg of the solid catalyst (III) prepared as described in Catalyst Preparations. Hydrogen was then introduced into the autoclave to the pressure corresponding to a partial pressure of 0.53 kg/cm². 1.4 kg of liquid propylene was then introduced into the autoclave under pressure and polymerized while maintaining the autoclave at a temperature of 60°C for a period of 4 hours. After completion of the polymerization, unreacted gas was purged, and 100 cc of methanol was added to the polymerization system to decompose the catalyst. The polymer thus obtained was separated by filtration using a Buchner funnel, washed 3 times with 500 cc of portions of heptane and dried at 60°C under reduced pressure to obtain 277 g of a polypropylene.

The polymerization activity of the solid catalyst (III) used above was 1150 in terms of the polymerization rate (Rp) per g-catalyst (III) hr. The polymer content which is insoluble in boiling hexane in the resulting polymer was found to be 96.2%, indicating that the polymer is highly stereospecific. The polymer had a bulk density of 0.47.

COMPARATIVE EXAMPLE 1

Propylene was polymerized in the same manner as described in Polymerization Process 1 of Example 1 but using 1.512 g of a β-type titanium trichloride to obtain 750 g of a polypropylene.

In this procedure, the polymerization activity of the catalyst was found to be 124 in terms of the polymerization rate (Rp), indicating that the polymerization activity is low.

COMPARATIVE EXAMPLE 2

Propylene was polymerized in the same manner as described in Polymerization Process 1 of Example 1 but using 1.603 g of the solid catalyst (I) prepared in Catalyst Preparation 2 above to obtain 765 g of a polypropylene.

In this procedure, the polymerization activity of the catalyst was found to be 118 in terms of the polymerization rate (Rp), and the polymer content which is insoluble in boiling heptane in the resulting polymer was 80.6%, indicating that the stereospecificity of the polymer is low.

COMPARATIVE EXAMPLE 3

Propylene was polymerized in the same manner as described in Polymerization Process 1 of Example 1 but using 1.395 g of the solid catalyst (II) prepared in Catalyst Preparation 3 above to obtain 925 g of a polypropylene.

In this procedure, the polymerization activity of the catalyst was found to be 116 in terms of the polymerization rate (Rp) and the polymer content which is insoluble in boiling heptane of the resulting polymer was 96.2%. The bulk density of the polymer was 0.45.

COMPARATIVE EXAMPLES 4 TO 6

Solid catalysts were prepared under the same conditions as those used in Catalyst Preparations of Example 1 but using other organoaluminum compounds shown in Table 1 below in place of ethyl aluminum dichloride in the preparation of the solid catalyst (II), and propylene was polymerized in the same manner as described in Polymerization Process 1 of Example 1 using the resulting solid catalyst (II). The results obtained are shown in Table 1 below.

Table 1

| Comparative Example Nos. | Organoaluminum Compound | Rp | Insolubles in Boiling Heptane (%) | Bulk Density (g/cc) |
|---|---|---|---|---|
| 4 | Triethyl Aluminum | 31 | Amorphous | 0.33 |
| 5 | Diethyl Aluminum Chloride | 145 | 80.2 | 0.35 |
| 6 | Ethyl Aluminum Sesquichloride | 119 | 79.5 | 0.35 |

EXAMPLES 2 TO 9

Propylene was polymerized in the same manner as described in Polymerization Process 1 of Example 1 using a solid catalyst (III) which was prepared as described in Catalyst Preparations but using the following conditions for the di-n-butyl ether treatment of the solid catalyst (II). The results obtained are shown in Table 2 below.

Table 2

| Example Nos. | Solid Catalyst (II) (g) | Conditions for Treatment | | | Polymer Properties | | |
| | | Di-n-Butyl Ether (g) | Di-n-Butyl Solid Catalyst (II) (Weight Ratio) | Temp. (°C) | Rp | Insolubles in Boiling Heptane (%) | Bulk Density (g/cc) |
|---|---|---|---|---|---|---|---|
| 2 | 2.32 | 11.4 | 4.93 | 28 | 374 | 96.2 | 0.45 |
| 3 | 2.53 | 5.81 | 2.30 | 28 | 361 | 96.0 | 0.45 |

Table 2-continued

| Example Nos. | Solid Catalyst (II) (g) | Conditions for Treatment | | | Polymer Properties | | |
|---|---|---|---|---|---|---|---|
| | | Di-n-Butyl Ether (g) | Di-n-Butyl Solid Catalyst (II) (Weight Ratio) | Temp. (°C) | Rp | Insolubles in Boiling Heptane (%) | Bulk Density (g/cc) |
| 4 | 2.14 | 1.16 | 0.54 | 28 | 314 | 90.1 | 0.44 |
| 5 | 2.31 | 0.58 | 0.25 | 28 | 288 | 96.2 | 0.46 |
| 6 | 2.10 | 0.27 | 0.13 | 28 | 280 | 96.2 | 0.44 |
| 7 | 2.38 | 0.12 | 0.05 | 28 | 254 | 96.1 | 0.43 |
| 8 | 2.86 | 2.86 | 1.25 | 45 | 356 | 96.1 | 0.46 |
| 9 | 2.51 | 2.51 | 1.25 | 65 | 361 | 96.1 | 0.45 |

EXAMPLES 10 TO 15

Solid Catalysts were prepared using the same parameters as described in Example 1 except for employing different types of the complexing agent, and propylene was polymerized in the same manner as described in Polymerization Process 1 of Example 1 using the resulting solid catalyst. The results obtained are shown in Table 3 below.

TABLE 3

| Example No. | Treatment of β-Type TiCl₃ with Complexing Agent | | Treatment of Solid Catalyst (II) with Complexing Agent | | Polymer Properties | | |
|---|---|---|---|---|---|---|---|
| | Complexing Agent | Complexing Agent TiCl₃ (Molar Ratio) | Complexing Agent | Complexing Agent TiCl₃ (Weight Ratio) | Rp | Insolubles in Boiling Heptane (%) | Bulk Density (g/cc) |
| 10 | n-Butyl Ether | 1.0 | Diethyl Ether | 1.25 | 366 | 95.9 | 0.44 |
| 11 | n-Butyl Ether | 1.0 | Di-n-Butyl Sulfide | 1.25 | 282 | 95.7 | 0.43 |
| 12 | n-Butyl Ether | 1.0 | Triethylamine | 0.12 | 258 | 95.5 | 0.43 |
| 13 | Di-n-Butyl Sulfide | 1.0 | Diethyl Ether | 1.25 | 279 | 93.1 | 0.41 |
| 14 | Di-n-Butyl Sulfide | 1.0 | N,N-Dimethylacetamide | 0.23 | 249 | 93.4 | 0.40 |
| 15 | Di-n-Butyl Sulfide | 1.0 | N,N-Dimethylaniline | 0.31 | 260 | 92.2 | 0.40 |

While the invention has been described in detail and with reference to specific embodiments thereof, it will be apparent to one skilled in the art that various changes and modifications can be made therein without departing from the spirit and scope thereof.

What is claimed is:

1. A process for preparing a solid catalyst for the polymerization of olefins which comprises the steps of (1) reducing titanium tetrachloride with an organoaluminum compound represented by the formula

wherein R represents a straight chain or branched chain alkyl group having 1 to 18 carbon atoms, an alicyclic hydrocarbon group or an aromatic hydrocarbon group, X represents a halogen atom, and $n$ is a value of from 1 to 3, inclusive, (2) reacting the resulting β - type titanium trichloride with a complexing agent, (3) reacting the solid catalyst thus obtained with an organoaluminum compound represented by the formula

wherein R' represents a straight chain or branched chain alkyl group having 1 to 18 carbon atoms, an alicyclic hydrocarbon group or an aromatic hydrocarbon group, X represents a halogen atom, and $m$ is a value of $0<m<1.5$, and (4) reacting the resulting solid catalyst with a complexing agent wherein said complexing agent is selected from the group consisting of N,N-dimethylformamide, N,N-dimethylacetamide, N,N-dimethylpropionamide, N,N,N',N'-tetramethylurea, diethyl ether, di-n-propyl ether, diisopropyl ether, di-n-butyl ether, diisobutyl ether, di-tert-butyl ether, di-n-amyl ether, diisoamyl ether, dineopentyl ether, di-n-hexyl ether, di-n-octyl ether, diphenyl ether, di-o-tolyl ether, di-p-tolyl ether, dicyclohexyl ether, diethyl sulfide, di-n-propyl sulfide, di-n-butyl sulfide, di-tert-butyl sulfide, diphenyl sulfide, trimethylamine, triethylamine, tri-n-butylamine, triphenylamine, pyridine, quinoline, sym-triazine, N,N-dimethylaniline, N,N-diethylaniline and N,N,N',N'-tetramethylethylenediamine.

2. The process according to claim 1, wherein said organoaluminum compound used in said reduction step (1) is methyl aluminum dichloride, ethyl aluminum dichloride, n-propyl aluminum dichloride, methyl aluminum sesquichloride, ethyl aluminum sesquichloride, dimethyl aluminum chloride, diethyl aluminum chloride, di-n-propyl aluminum chloride, trimethyl aluminum, triethyl aluminum or triisobutyl aluminum.

3. The process according to claim 1, wherein said reduction is at a temperature of from about −100° to 60°C in the presence of an inert slvent.

4. The process according to claim 3, wherein said inert solvent is hexane, heptane, octane or decalin.

5. The process according to claim 1, wherein said reacting in the step (2) is at a temperature of about 0° to 100°C using a molar ratio of 0.05 to 3 moles of said complexing agent per mole of said titanium trichloride in the presence of a diluent.

6. The process according to claim 1, wherein said organoaluminum compound used in the step (3) is methyl aluminum dichloride, ethyl aluminum dichloride, n-propyl aluminum dichloride, n-butyl aluminum dichloride, n-hexyl aluminum dichloride, n-octyl aluminum dichloride, phenyl aluminum dichloride, o-tolyl aluminum dichloride, cyclohexyl aluminum dichloride, methyl aluminum dibromide, ethyl aluminum dibromide, phenyl aluminum dibromide, methyl aluminum diiodide or ethyl aluminum diiodide.

7. The process according to claim 1, wherein said reaction in the step (3) is at a temperature of from room temperature to about 200°C.

8. The process according to claim 1, wherein said reaction in the step (4) is at a temperature of about −78° to 150°C in a molar ratio of from 0.001 to 10 moles of said complexing agent per mole of said solid catalyst in the presence of a diluent.

9. A solid catalyst for the polymerization of olefins prepared by the process as defined in claim 1.

* * * * *